United States Patent [19]

Kim

[11] Patent Number: 5,581,382
[45] Date of Patent: Dec. 3, 1996

[54] LIQUID CRYSTAL DISPLAY DEVICE HAVING CONNECTION PADS INSULATED BY DOUBLE LAYERED ANODIC OXIDE MATERIAL

[75] Inventor: Geon T. Kim, Kyungki-do, Rep. of Korea

[73] Assignee: Goldstar Co., Ltd., Seoul, Rep. of Korea

[21] Appl. No.: 357,519

[22] Filed: Dec. 16, 1994

[30] Foreign Application Priority Data

Dec. 17, 1993 [KR] Rep. of Korea .................. 28316/1993

[51] Int. Cl.$^6$ ..................... G02F 1/1343; H01L 23/48
[52] U.S. Cl. ..................... 349/42; 257/690; 257/784; 257/786; 349/42
[58] Field of Search ..................... 257/690, 784, 257/786; 359/59, 88

[56] References Cited

U.S. PATENT DOCUMENTS

| | | | |
|---|---|---|---|
| 5,172,212 | 9/1992 | Baba | 257/738 |
| 5,187,604 | 2/1993 | Taniguchi et al. | 359/88 |
| 5,349,205 | 9/1994 | Kobayashi et al. | 257/59 |
| 5,430,329 | 7/1995 | Harada et al. | 257/786 |

Primary Examiner—Wael M. Fahmy
Assistant Examiner—Fetsum Abraham

[57] ABSTRACT

A TFT-LCD panel structure to prevent a TFT-LCD device provided therein from being damaged due to moisture penetration. The structure comprises upper and lower substrates and a display part having a thin film transistor array provided with a plurality of gate bus lines. A plurality of source bus lines are formed on the lower substrate and a pixel portion is formed on the upper substrate. A liquid crystal layer is formed between the substrates. Gate pad portions are formed at one side of the display part and include a plurality of gate pads connected to each corresponding gate bus line, for supplying a driving voltage to each of the gate bus lines through each corresponding gate pad. A first single passivation layer encloses each of the gate pad portions. Source pad portions are formed at upper and lower sides of the display part and include a plurality of source pads connected to each corresponding source bus line, for supplying a signal voltage to the source bus lines. Each of the source pad portions is enclosed in a second single passivation layer. A third passivation layer covers only the display part other than the gate and source pad portions.

8 Claims, 6 Drawing Sheets

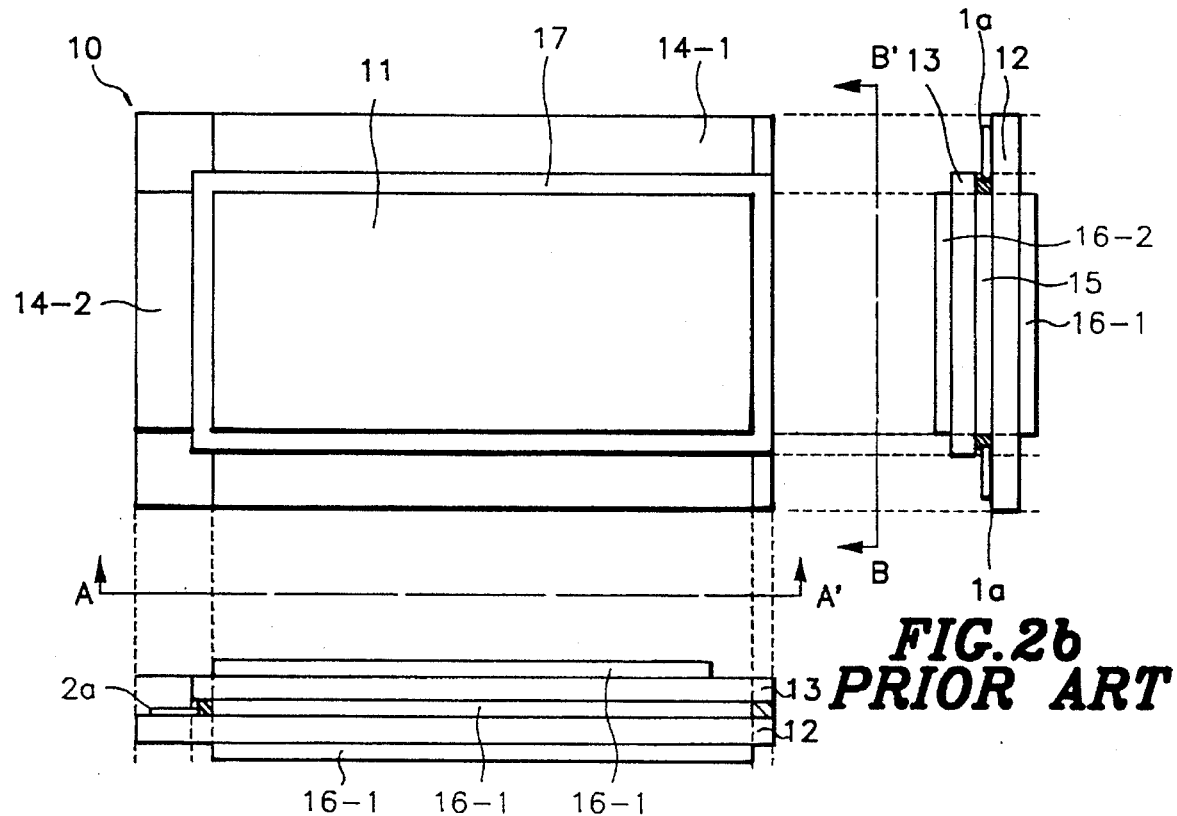

5,581,382

LIQUID CRYSTAL DISPLAY DEVICE HAVING CONNECTION PADS INSULATED BY DOUBLE LAYERED ANODIC OXIDE MATERIAL

BACKGROUND OF THE INVENTION

1. Field of the Invention

The present invention relates to a liquid crystal display (hereinafter, referred to as "LCD") panel, and more particularly to a liquid crystal display device structure constructed to prevent an LCD device provided therein from being damaged due to moisture penetration.

2. Description of the Prior Art

FIG. 1 is a schematic cross-sectional view showing the construction of a prior art TFT-LCD module.

As shown in FIGS. 1 and 2, the prior art TFT-LCD module comprises a TFT-LCD (thin film transistor-liquid crystal display) panel 10, a PCB (printed circuit board) substrate 20, a bare chip 31 of a driving IC (integrated circuit) for driving the TFT-LCD panel 10 and a TCP (tape carrier package) 30 having both surfaces on which the PCB substrate 20 and the TFT-LCD panel 10 are attached.

The TFT-LCD panel 10, as shown in FIGS. 2A to 2C, broadly comprises a display part 11 and a pad part 14. The display part 11 has a TFT (thin film transistor) array portion formed on a lower substrate 12 (FIGS. 2b and 2c) and a pixel portion formed on an upper substrate 13. The pad part 14 has a gate pad portion 14-2 formed at a left side of the display part 11, for sequentially supplying a driving voltage to gate bus lines of the TFT array portion, and a source pad portion 14-1 for supplying a data voltage to a liquid crystal cell. A passivation layer 17 is deposited only on the display part 11 of the TFT-LCD panel 10, and not on the pad part 14.

Also, the TFT-LCD panel 10 has the upper substrate 13 and the lower substrate 12 spaced from each other and a liquid crystal layer 15 is provided therebetween by liquid crystal injection and sealing. Polarization plates 16-1 and 16-2 are attached to outside surfaces of the substrates 12 and 13. It is shown in FIG. 2 that the gate pad portion 14-2 of the pad portion 14 is located adjacent a left side of the display part 11. However, the gate pad portion 14-2 may also be located adjacent a right side of the display part 11.

The method for fabricating the above-described TFT-LCD module will be described below:

First, a TFT array portion and the pad part 14 are formed on a lower substrate 12. Then, a color filter constituting a pixel portion is formed on the upper substrate 13. The upper and lower substrates 13 and 12 are spaced from each other and a liquid crystal layer 15 is formed therebetween. Also, polarization plates 16-1 and 16-2 are respectively attached to outside surfaces of the substrates 12 and 13. Next, after formation of a TCP 30 provided with a bare chip 31 for driving a TFT-LCD panel 10, inner leads of the TCP 30 are bonded to the pad part 14. Finally, the TFT-LCD panel 10 and the TCP 30 are assembled on a PCB substrate 20.

FIG. 3 shows a schematic view showing the construction of another prior art TFT-LCD panel, wherein FIG. 3A is a plane view thereof and FIG. 3B is a cross-sectional view thereof. Component elements having similar functions to the component elements of the TFT-LCD panel shown in FIGS. 1 and 2, and are indicated by the same reference numerals, therefore descriptions thereof are omitted.

Referring to FIGS. 3A and 3B, a gate pad portion 14-2 of a pad part 14 is established at a left side of a display part 11 in the TFT-LCD panel 10 and provided with a plurality of pads 2a. Source pad portions 14-1 of the pad part 14 are established at upper and lower sides of the display part 11. Each source pad portion 14-1 is provided with a plurality of pads 1a. The number of the pads 2a in the gate pad portion 14-2 is equal to the number of gate bus lines. The number of the pads 1a in the source pad portion 14-1 is equal to the number of source bus lines.

FIG. 4 is a plane view of the TCP 30 of FIG. 1 connected with the pad part 14 in the TFT-LCD panel 10, shown in FIG. 1. The TCP 30 has a mounting portion 32 where the bare chip 31 (see FIG. 1) of the driving IC is mounted, inner leads 33 connected to respective pads of the pad part 14 (see FIG. 2), and slanting leads 34 for electrically connecting the bare chip 31 with the inner leads 33.

The number of the inner leads 33 is equal to the number of the pads. The inner leads 33 are indicated in FIG. 4 by thin lines but in practice, inner leads 33 have a specified width wide enough to be connected with the respective pads. The respective pads are electrically contacted with the inner leads 33 during bonding of the liquid crystal module.

Subsequently, during assembly of the liquid crystal module, the TFT-LCD panel is adhered to the TFT-LCD module, thereby allowing input data to be displayed on the display part 11 by an electric field occurring due to a voltage applied through each of the pads.

In the prior art TFT-LCD panel of FIGS. 1–3, the passivation layer 17 is not formed over the whole surface of the TFT-LCD panel, but is formed only on the display part 11, the pads of the pad part 14, all which are connected to inner leads of the TCP 30, are exposed. Since the pad part 14 is exposed, moisture can penetrate to the pad part 14 and damage the pad part 14.

To prevent damage to the pad part 14 caused by moisture penetration, a silicon epoxy is deposited between a glass substrate and an edge portion of a pad where a TCP is bonded. However, since a pin-hole is generated in such a silicon epoxy, it is impossible to avoid damage of the pad part caused due to moisture penetration through the pin-hole.

When the above situation happens, an electrical open of a bus line on the display part occurs therein due to a damage of the pad part, and a TFT-LCD device of a TFT-LCD panel is seriously affected.

SUMMARY OF THE INVENTION

It is an object of the present invention to provide a TFT-LCD (thin film transistor-liquid crystal display) panel in which a single passivation layer is formed around the outskirts of a pad part, except over a portion to be connected with a respective inner lead of a TCP (tape carrier package), so as to prevent the pad part from being damaged by moisture penetration.

It is a further object of the present invention to provide a TFT-LCD panel in which a passivation layer is composed of multiple layers and is formed on the outskirts of a pad part except over a portion to be connected with a respective inner lead of a TCP, so as to prevent the pad part from getting damaged by moisture penetration.

It is another object of the present invention to provide a TFT-LCD panel in which a transparent insulating layer for passivation is formed around the outskirts of a pad part, except over a portion to be connected with a respective inner lead of a TCP, so as to prevent an electrical open of a bus line, and between pads of a TCP and to improve production yield.

According to one embodiment of the present invention, the liquid crystal display panel comprises upper and lower substrates and a display part having a thin film transistor array provided with a plurality of gate bus lines. A plurality of source bus lines is provided on the lower substrate, a pixel portion formed on the upper substrate, and a liquid crystal layer formed between the substrates. Gate pad portions are formed at one side of the display panel and are provided with a plurality of gate pads connected to each corresponding gate bus line, for supplying a driving voltage to each of the gate bus lines through each corresponding gate pad. Each of the gate pad portions is enclosed with a first single passivation layer. Source pad portions formed at upper and lower sides of the display part are provided with a plurality of source pads connected to each corresponding source bus line, for supplying a signal voltage to the source bus lines. Each of the source pad portions is enclosed within a second single passivation layer. A third passivation layer covers only the display part, but not the gate and source pad portions.

In this panel, each of the first and second passivation layers is composed of a transparent insulating layer. The transparent insulating layer is composed of either an anodic oxide layer or a nitride layer. Each of the pads of the source and gate pad portions is composed of a metal for anodic-oxidizing such as chrome.

According to another aspect of the present invention; the liquid crystal display panel comprises upper and lower substrates; and a display part having a thin film transistor array provided with a plurality of gate bus lines. A plurality of source bus lines is provided on the lower substrate, a pixel portion is formed on the upper substrate, and a liquid crystal layer is formed between the substrates. A pair of gate pad portions are formed adjacent a side of the display part and provided within a plurality of gate pads connected to each corresponding gate bus line, for supplying a driving voltage to each of the gate bus lines through each corresponding gate pad. Each of the gate pad portions is enclosed with a first double-layer passivation layer. A pair of source pad portions are formed at upper and lower sides of the display part and each is provided with a plurality of source pads connected to a corresponding source bus lines, for supplying a signal voltage to the source bus lines. Each of the source pad portions is enclosed with a second double-layer passivation layer; and a third passivation layer covers only the display part other than the gate and source pad portions.

In this panel, each of the first and second double-layer passivation layers is provided with a first layer enclosing each pad and a second layer enclosing the first layer. Each of the first and second layers is composed of a transparent insulating layer. The first layer is composed of an anode oxide layer and the second layer is composed of a nitride layer.

BRIEF DESCRIPTION OF THE DRAWINGS

This invention maybe better understood and its objects and advantages will become more apparent to those skilled in the art by reference to the accompanying drawings as follows:

FIG. 2 shows the TFT-LCD panel shown in FIG. 1, wherein FIG. 2A is a plane view thereof, FIG. 2B is a cross-sectional view taken along the line A–A' of FIG. 2A and FIG. 2C is a cross-sectional view taken along the line B–B' of FIG. 2A;

FIG. 3 is a schematic view showing the construction of another prior art TFT-LCD panel, wherein

FIG. 5 is a schematic view showing the construction of a TFT-LCD panel according to one embodiment of the present invention, wherein FIG. 6 is a schematic view showing the construction of a TFT-LCD panel according to another embodiment of the present invention, wherein

DESCRIPTION OF THE PREFERRED EMBODIMENTS

Figure 1:
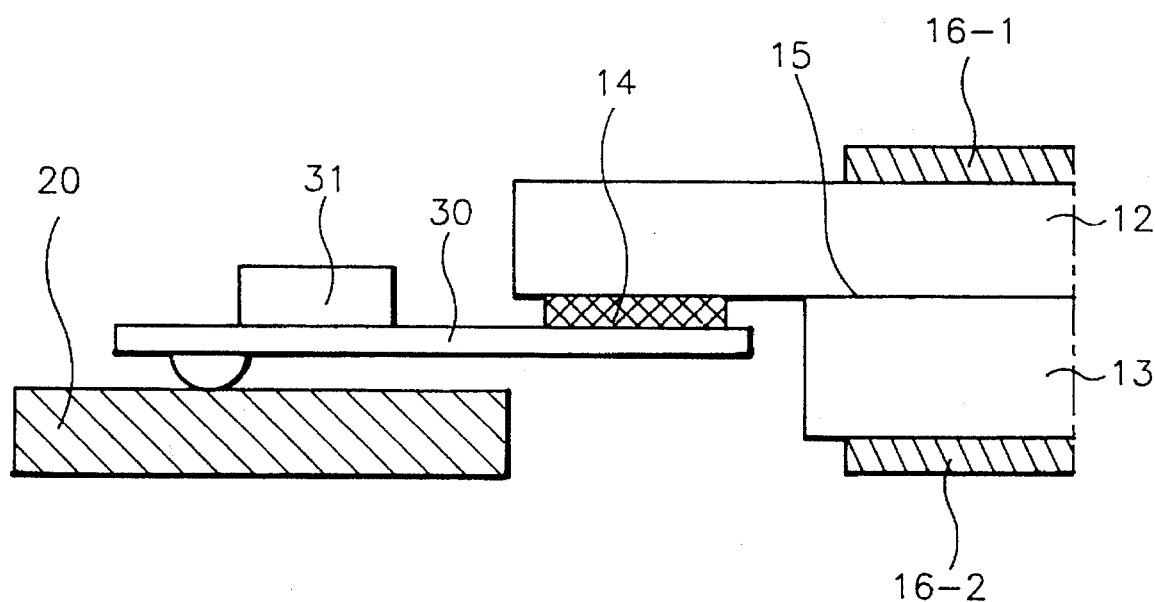
FIG. 1 is a schematic cross sectioned view showing the construction of a prior art TFT-LCD module.
Figure 3A:
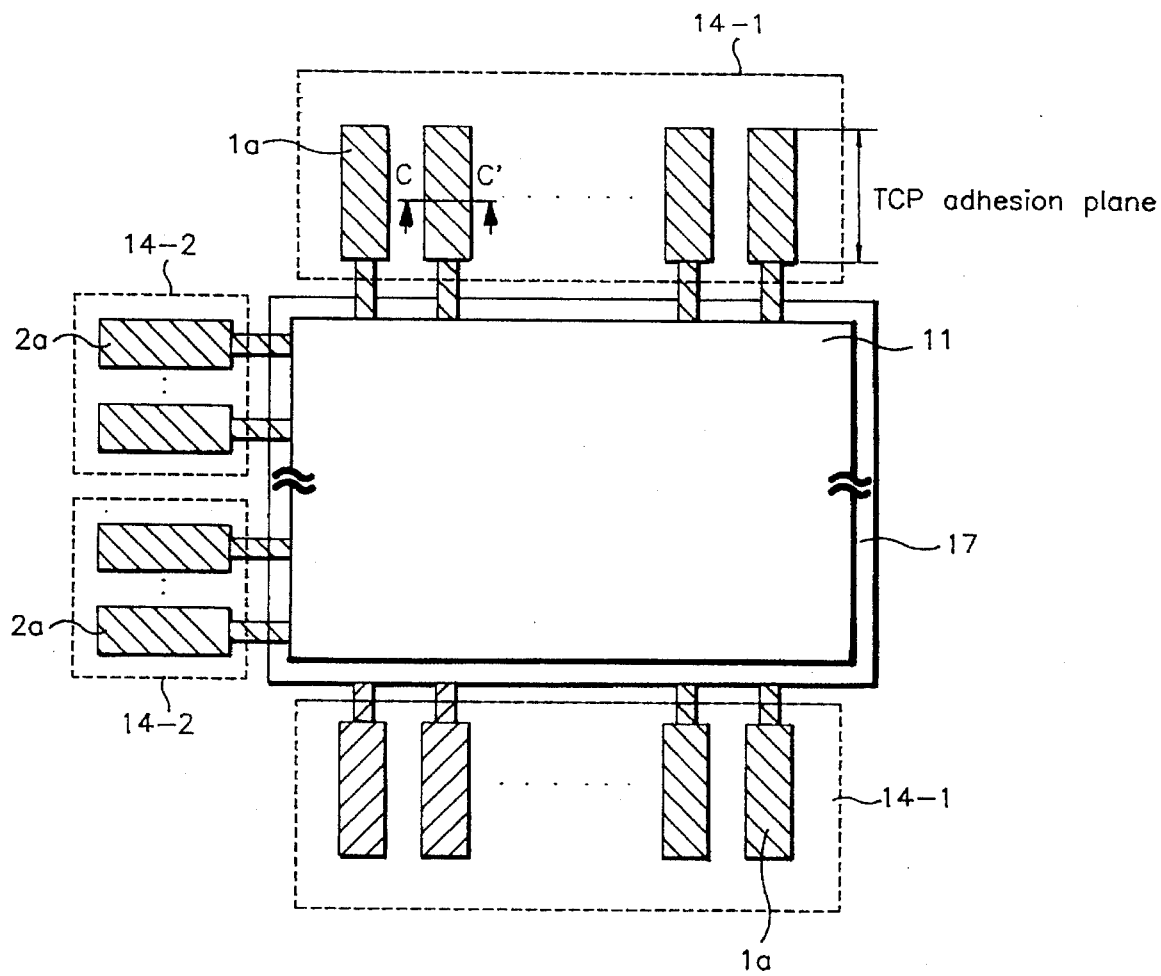
FIG. 3A is a plane view and FIG. 3B is a cross-sectional view of a pad taken along the line C–C' of FIG. 3A.
Figure 3B:
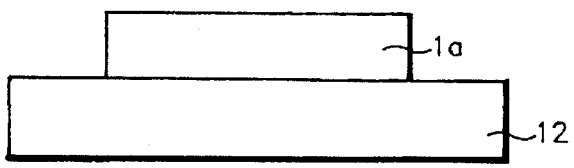
Figure 4:
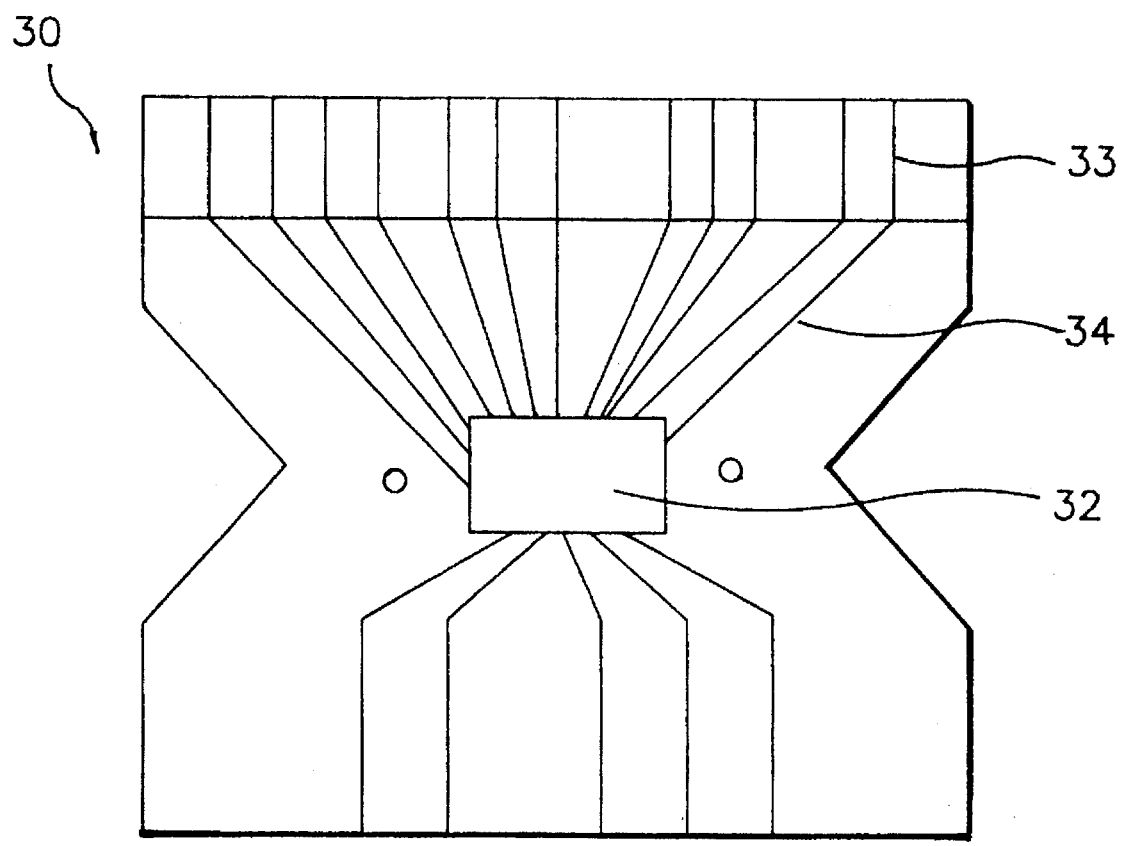
FIG. 4 is a plane view showing the TCP of the prior art TFT-LCD panel.
Figure 5A:
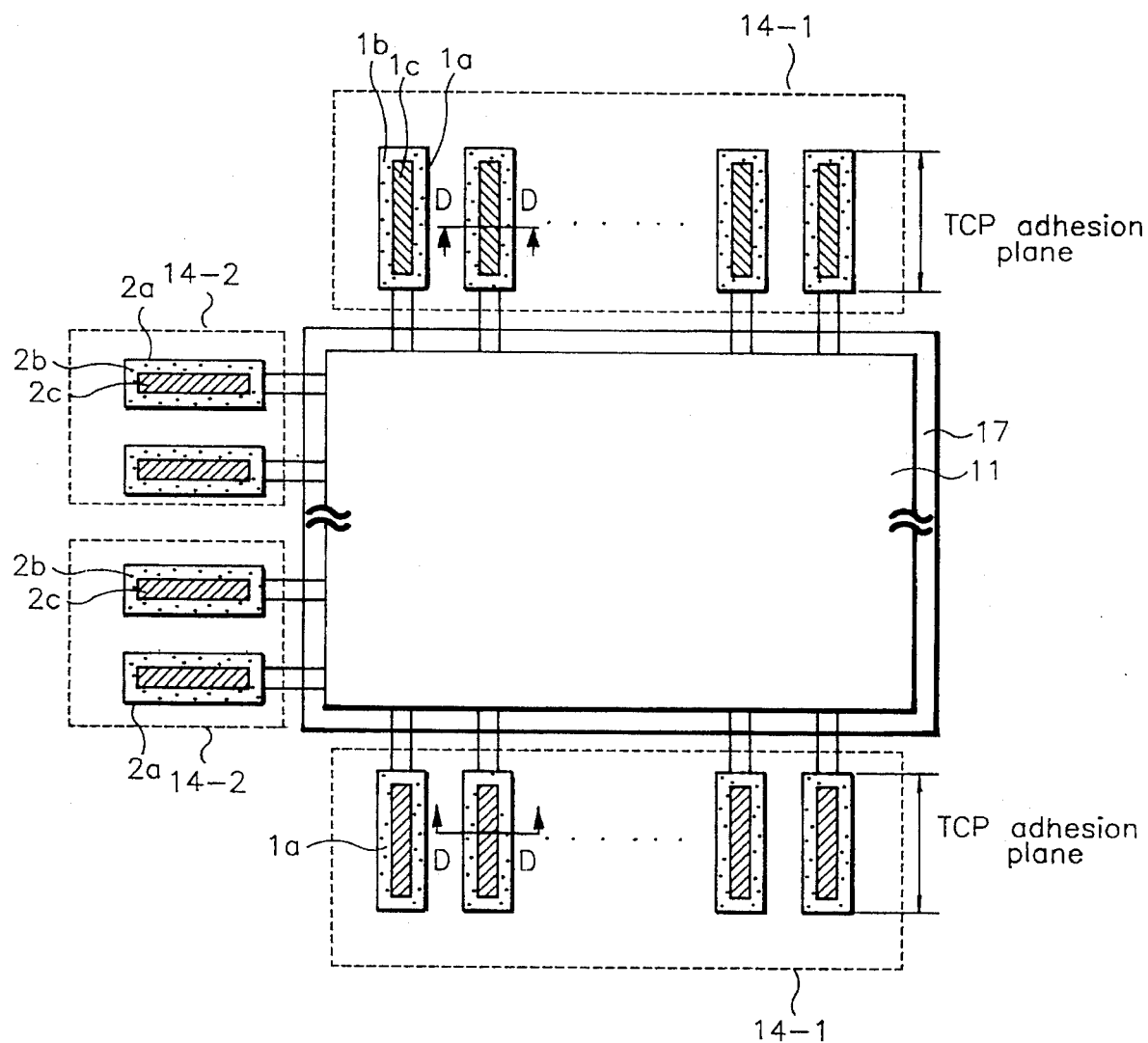
FIG. 5A is a plane view showing the TFT-LCD panel with a single passivation layer and FIG. 5B is a cross-sectional view of a pad taken along the line D–D' of FIG. 5A.
Figure 6A:
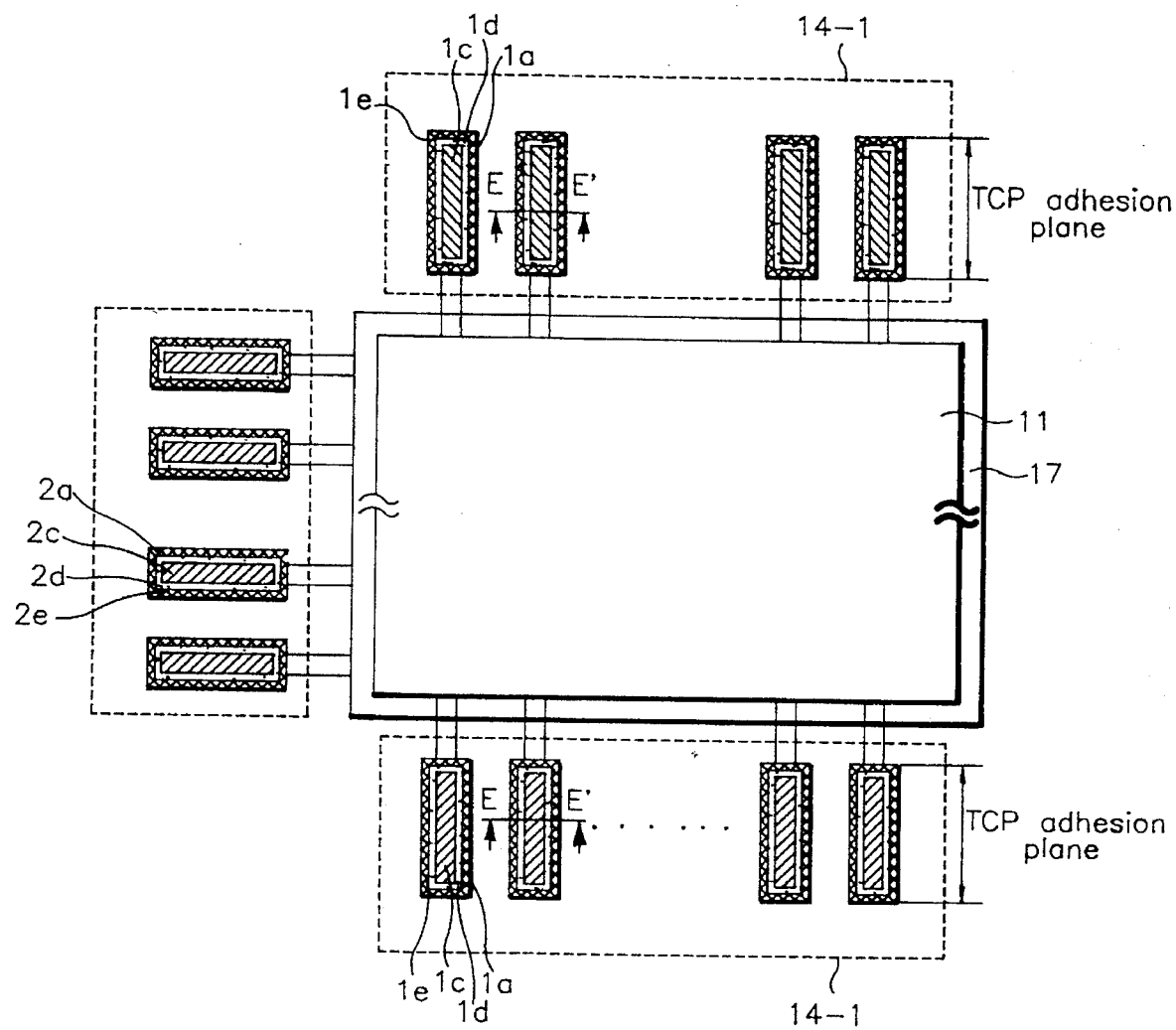
FIG. 6A is a plane view showing the TFT-LCD panel with a multi-layer passivation layer and FIG. 6B is a cross-sectional view of a pad taken along the line E–E' of FIG. 5B.

FIG. 5A is a plane view showing the TFT-LCD panel with a single passivation layer according to one embodiment of the present invention. FIG. 6A is a plane view showing the TFT-LCD panel with a multi-layer passivation layer according to another embodiment of the present invention. Component elements having similar functions to the component elements of the TFT-LCD panel (shown in FIGS. 1 and 2) are indicated by the same reference numerals, and descriptions thereof are omitted.

Referring to FIG. 5, the TFT-LCD panel comprises a display part 11, a pad part 14 connected with inner leads of a TCP, and an insulating layer 17 covering the display part 11 but not the pad part 14. The display part 11 has a TFT (thin film transistor) array portion provided with a plurality of gate bus lines. A plurality of source bus lines is provided on a lower substrate 12, and a pixel portion is formed on an upper substrate 13 (not shown). The upper and lower substrates 13 and 12 are spaced from each other, and a liquid crystal layer 15 (not shown) is formed by injection of a liquid crystal material between the substrates. Polarization plates 16-1 and 16-2 (not shown) are attached to outside surfaces of the substrates 12 and 13, respectively.

The pad part 14 has gate pad portions 14-2 formed at a left side of the display part 11 and includes a plurality of pads 2a, and source pad portions 14-1 are formed at upper and lower sides of the display part 11 and include a plurality of pads 1a. Each of pads 1a and 2a of the pad part 14 is composed of a metal for anodic oxidation.

Figure 5B:
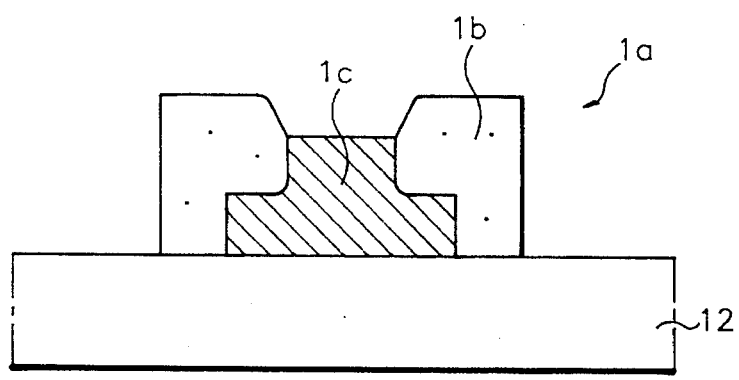

FIG. 5A is a plane view showing the TFT-LCD panel with a single passivation layer according to one embodiment of the present invention and FIG. 5B is a cross-sectional view taken along the line D–D' of a pad 1a of FIG. 5A.

With reference to FIG. 5B, in each pad 1a of the source pad portion 14-1, a center portion 1c is an original pad. A passivation layer portion 1b encloses the original pad 1c. The passivation layer 1b is composed of a transparent anodic-oxide layer (i.e., chrome layer) or a transparent nitride layer.

When an anodic-oxide layer is used as a passivation layer, the anodic-oxide layer is formed around the original pad 1c by oxidation of a metal capable of anodic-oxidizing. During anodic oxidation, a thickness increase of several hundred angstroms is generated by a volume expansion due to formation of the anodic oxide layer. As a result, the passivation layer 1b is formed.

Furthermore, the gate pad portion 14-2 has a structure similar to that of the source pad portion 14-1. A nitride layer can be used as a passivation layer. The nitride layer is formed around the original pad 1c.

In this embodiment, while assembling the TFT-LCD module, a TCP is bonded to the transparent passivation layer 1b together with the original pad 1c, thereby creating a seal to prevent moisture penetration into the pad part 14.

Figure 6B:
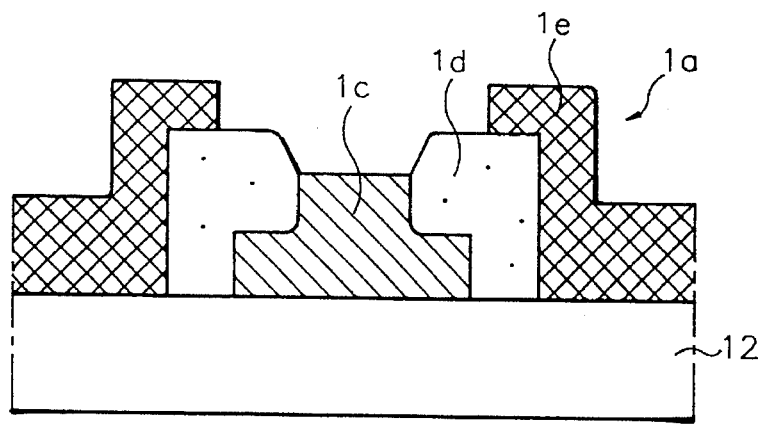

FIG. 6A is a plane view showing the TFT-LCD panel with a multi-layer passivation layer according to another embodiment of the present invention. FIG. 6B is a cross-sectional view of a pad 1a taken along the line E–E' of FIG. 6A.

With reference to FIG. 6B, in each pad 1a of the source pad portion 14-1, a center portion 1c is an original pad and a portion enclosing the original pad 1c is a double-layer passivation layer. The double-layer passivation layer includes of a first passivation layer 1d enclosing the original pad 1c and a second passivation layer 1e enclosing the first passivation layer 1d. The first passivation layer 1d includes an anodic oxide layer and the second passivation layer 1e includes a nitride layer.

Similarly to the source pad portion 14-1, the gate pad portion 14-2 also has the same structure, as shown in FIG. 6A.

In the embodiment of FIG. 6, since each pad 1a and 2a of the pad part 14 is enclosed within the first and second passivation layers 1d and 1e of the double-layer structure, moisture penetration into the pad part 14 is further prevented in comparison to the embodiment of FIG. 5.

As described above, the TFT-LCD panel of the present invention is provided with a single passivation layer or a double-layer passivation layer for preventing moisture penetration into a pad part, whereby the pad part can be prevented from being damaged due to a moisture penetration.

Also, because moisture penetration can be prevented in the pad part of the panel, it is possible to prevent an electrical open of a bus line and the like.

In addition, because a passivation layer formed between pads is composed of a transparent layer, it is possible to easily prevent an electrical short between pads during bonding of the TFT-LCD module.

Although the present invention has been described with reference to preferred embodiments, those skilled in the art will recognize that changes may be made in form and detail, without departing from the spirit and scope of the invention.

What is claimed is:

1. A liquid crystal display device comprising:

upper and lower substrates, a pixel portion formed on the upper substrate, a plurality of source bus lines on the lower substrate;

a display part having a thin film transistor array provided with a plurality of gate bus lines;

a liquid crystal layer formed between the substrates;

gate pad portions formed adjacent the display part and including a plurality of gate pads each connected to a corresponding gate bus line, for supplying a driving voltage to each of the gate bus lines through each corresponding gate pad;

a single passivation layer enclosing each of the gate pad portions, said single passivation layer including a first anodic oxide;

source pad portions formed at upper and lower sides of the display part and including a plurality of source pads connected to each corresponding source bus line, for supplying a signal voltage to the source bus lines;

a second single passivation layer enclosing each of the source pad portions, said second single passivation layer including a second anodic oxide; and a third passivation layer covering only the display part other than the gate and source pad portions.

2. The device of claim 1, wherein each of the first and second passivation layers includes a transparent insulating layer.

3. The device of claim 2, wherein the transparent insulating layer includes a nitride layer.

4. The device of claim 1, wherein each of the pads of the source and gate pad portions is composed of a metal for anodic-oxidizing.

5. A liquid crystal display device comprising;

upper and lower substrates, a pixel portion formed on the upper substrate, a plurality of source bus lines on the lower substrate;

a display part having a thin film transistor array provided with a plurality of gate bus lines;

a liquid crystal layer formed between the substrates;

gate pad portions formed adjacent to the display part and including a plurality of gate pads each connected to a corresponding gate bus lines, for supplying a driving voltage to each of the gate bus lines through each corresponding gate pad, a first double-layer passivation layer enclosing each of the gate pad portions, said first double-layer passivation layer including a first anodic oxide;

source pad portions formed at upper and lower sides of the display part and including a plurality of source pads each connected to a corresponding source bus line, for supplying a signal voltage to the source bus lines; a second double-layer passivation layer enclosing each of the source pad portions, said second double-layer passivation layer including a second anodic oxide; and a third passivation layer covering only the display part other than the gate and source pad portions.

6. The device of claim 5, wherein each of the first and second double-layer passivation layers includes a first layer enclosing each pad and a second layer enclosing the first layer.

7. The device of claim 6, wherein each of the first and second layers includes a transparent insulating layer.

8. The device of claim 7, wherein the first layer of said first double-layer passivation layer includes said first anode oxide and the second layer of said first double-layer passivation layer includes a first nitride layer, and the first layer of the second double-layer passivation layer includes said second anode oxide and the second layer of said second double-layer passivation layer includes a second nitride layer.

* * * * *